Patented Apr. 19, 1938

2,114,491

UNITED STATES PATENT OFFICE 2,114,491

METHOD FOR PRODUCING NITROCELLULOSE SOLUTIONS

Cleveland B. Hollabaugh, Wilmington, Del., assignor to Hercules Powder Company, Wilmington, Del., a corporation of Delaware No Drawing. Application February 23, 1934, Serial No. 712,681

4 Claims. (Cl. 134—79)

This invention relates to a method for producing nitrocellulose solutions such as lacquers, enamels, plastics, and the like, generally, and more particularly will enable the production of anhydrous nitrocellulose solutions if desired.

As is well known, it is desirable to avoid the presence of water in the ordinary forms of lacquers, enamels and the like, nitrocellulose solutions, since the presence of water causes precipitation of nitrocellulose and hence, for example, the formation of a clouded film, as the solvent leaves a lacquer, enamel, or the like, after it is applied to a surface. Nitrocellulose, however, is processed in the presence of water and as a consequence, to meet the desire of the trade for a substantial absence of water, it is dehydrated in final preparation for the market.

In effecting its dehydration the nitrocellulose is compressed under heavy pressure to effect removal of the major part of the water associated with it and the residual water is then removed by displacement with alcohol under heavy pressure. When dehydration is complete a certain amount of alcohol, say 30–35% by weight of the nitrocellulose, is permitted to remain to wet the nitrocellulose and reduce the fire hazard thereof.

The nitrocellulose wet with alcohol is used directly in the formation of lacquers, enamels, plastics and like solutions. The alcohol carried by the nitrocellulose enters into the solution and as a consequence drying of the nitrocellulose, which is a dangerous operation, is avoided.

The present procedure for dehydrating nitrocellulose by the displacement of water with alcohol is undesirable from the standpoint of the expense involved, more particularly from the power requirements and from the requirement for rectifying the alcohol used. Further, the alcohol-wet nitrocellulose is not satisfactory where an anhydrous solution is desired, since the alcohol cannot be entirely anhydrous under the conditions and consequently carries some water into the solution.

Now, in accordance with this invention there is provided a method for forming nitrocellulose solutions with the use of water-wet nitrocellulose and at the same time with the production of solutions which are substantially free from water and which, if desired, may be anhydrous.

Broadly speaking the method in accordance with this invention consists essentially in dissolving water-wet nitrocellulose, carrying say 30–35% by weight of water, in a solvent or solvent mixture for the nitrocellulose which is substantially immiscible with water and effecting evaporation of the water from the solution by blowing air through the solution.

The water-wet nitrocellulose, carrying about 30–35% by weight of water may also be dissolved in a solvent-diluent mixture comprising a solvent for the nitrocellulose and a nonaqueous diluent, both substantially immiscible with water, and effecting evaporation of the water from the solution by blowing air through the solution, some of the solvent and diluent coming off as vapor in the current of air, and aiding in carrying off the water as vapor.

More specifically, if an anhydrous solution is desired, such may be obtained by the method indicated where a solvent or solvent mixture having no miscibility with water is used.

In proceeding, when the water-wet nitrocellulose is dissolved, desirably with agitation, in the substantially water-immiscible solvent or solvent mixture the water will be dispersed in minute droplets throughout or emulsified in internal phase in the solution. The solution, or emulsion, will be white, opaque, and stable. When air is blown through the solution or emulsion the water will be evaporated and a clear solution of nitrocellulose will remain. With evaporation of the water more or less solvent will be evaporated, depending upon the relative vapor pressure of the solvent as compared with that of water. However, where the vaporization of solvent or solvent-diluent mixture is material in amount the vapors can be readily condensed from the air and recovered.

In practical procedure any substantially water-immiscible solvent for the nitrocellulose may be used, such as, for example, butyl acetate, amyl acetate, butyl propionate, hexyl acetate, amyl propionate, butyl butyrate, etc., or mixtures thereof, and with or without the addition of any substantially water-immiscible diluent or co-solvent as, for example, toluol, xylol, solvent naphtha, V. M. & P. naphtha, high flash naphtha, butanol, amyl alcohol, etc., or mixtures thereof.

In making up the original solution or emulsion nitrocellulose of any desired viscosity may be used and the solution or emulsion may contain any desired percentage or concentration of nitrocellulose so long as the viscosity of the solution or emulsion is such that air may be readily blown through it.

The air used for blowing the solution or emulsion may be at a temperature within a wide range with consideration for the evaporation of the water and the characteristics of the solvent used. Thus, for example, the blowing air may have a temperature of say, preferably, within about the range room temperature to 100° C., though a temperature of about 70° C. will be preferred on the average, since such temperature will give on the average a favorable ratio of water vapor pressure to solvent vapor pressure, but yet is not high enough to cause excessive drop in the viscosity characteristic of the nitrocellulose.

As illustrative of the carrying out of the method in accordance with this invention, where it is desired to obtain substantially anhydrous nitrocellulose solutions, for example, a composition is made up on the following formula:

| | Per cent |
|---|---|
| Nitrocellulose (viscosity ½ second) | 20 |
| Water (carried by the nitrocellulose) | 9 |
| Hexyl acetate | 71 |

The composition made up on the above formula will comprise a solution of the nitrocellulose in the hexyl acetate, having water dispersed in fine droplets throughout the solution, or emulsified in internal phase in the solution. The emulsion will be white, opaque and stable.

The emulsion having been made up on the above formula, it is warmed to a temperature of about 70° C. and air at a temperature of about 70° C. blown through it until it becomes entirely clear, evidencing the disappearance of the water phase and leaving a substantially anhydrous solution of nitrocellulose in hexyl acetate. As it will be appreciated, the air blowing causes evaporation of the water from the solution or emulsion. A certain amount of the solvent will be lost by evaporation with the water. However, with the use of hexyl acetate indicated in the above formula, the loss of solvent will be immaterial and there will be no great advantage in recovering vaporized solvent, which may be effected by condensing it from the air blown through the solution. With the use of other solvents for the nitrocellulose, which are of such character that substantial loss of solvent occurs by vaporization, as for example, butyl acetate, vaporized solvent may be recovered by condensing from the air, or by any other suitable method of solvent recovery, such as absorption in a non-volatile liquid or on activated carbon.

As further illustrative of the carrying out of the method in accordance with this invention, where it is not necessary to obtain nitrocellulose solutions so completely anhydrous as in the above example, a composition may be made up on the following formula:

| | Per cent |
|---|---|
| Nitrocellulose (viscosity ½ second) | 2 |
| Water (carried by the nitrocellulose) | 10.7 |
| Butyl acetate | 64.3 |

The composition made up on the above formula will comprise a solution of nitrocellulose in butyl acetate having water dispersed in fine droplets throughout the solution, or emulsified in internal phase in the solution. The emulsion will be white, opaque and stable. The emulsion, having been made up on the above formula, is warmed to a temperature of about 60° C. and air, at a temperature of about 60° C., blown through it until it becomes entirely clear, leaving a solution of nitrocellulose in butyl acetate carrying a very small proportion of water. As will be appreciated, the air blowing causes evaporation of the water from the solution or emulsion. A certain amount of the solvent will be lost by evaporation with the water. In the above example, using butyl acetate, the loss of solvent will be material and there will be substantial advantage in recovering vaporized solvent, which can be accomplished by condensing it from the air blown through the solution, or by other known means of solvent recovery.

As a further illustration of carrying out the method in accordance with this invention, where it is desirable to obtain in the resulting nitrocellulose solution less water than by the use of butyl acetate as above, a composition may be made up on the following formula:

| | Per cent |
|---|---|
| Nitrocellulose (viscosity ½ second) | 25 |
| Water (carried by the nitrocellulose) | 10.7 |
| Butyl acetate | 32.15 |
| Toluene | 32.15 |

The composition made up on the above formula will comprise a solution of nitrocellulose in the butyl acetate-toluene mixture having water dispersed in fine droplets throughout the solution, or emulsified in the internal phase in the solution. The emulsion will be white, opaque, and stable. The emulsion having been made up on the above formula is warmed to a temperature of about 40° C. and air, at a temperature of about 40° C., blown through it until it becomes entirely clear, as shown from the disappearance of the water phase, leaving a solution of nitrocellulose in butyl acetate and the inert diluent, toluene, and carrying substantially less water in the solution than in the above example where butyl acetate alone was used as solvent. In this instance the air escaping from the solution or emulsion will carry with it water vapor, butyl acetate vapor, and toluene vapor, and there will be substantial advantage in condensing from these escaping vapors the toluene and butyl acetate, separating them from the condensed water and reusing the recovered butyl acetate-toluene mixture.

Solutions treated as illustrated above may be used as such, but generally will provide base solutions for use in the making up of clear or pigmented lacquers, enamels, plastics, or the like, by the addition of well known ingredients, as other solvents, diluents, plasticizers, gums or resin, etc.

As has been indicated, the method in accordance with this invention will produce an anhydrous nitrocellulose solution which, so long as ingredients are added to it which do not carry any water, will enable the production of an anhydrous lacquer or enamel. Thus, in the above illustration using hexyl acetate, for example as the solvent all the water will be present as a second phase, distinct from the nitrocellulose solution and with no water dissolved therein. Consequently, when the water is evaporated the remaining nitrocellulose solution will be anhydrous. Such an anhydrous solution cannot, for example, be prepared with the alcohol-wet nitrocellulose heretofore commonly used in the making of solutions such as lacquers, enamels, plastics, and the like, because the alcohol carries some water which remains in the nitrocellulose solution.

The production of anhydrous solutions in accordance with this invention is a distinct advantage over the prior art, in that the water present in an ordinary prior art lacquer or enamel is responsible for corrosion of the cans in which the lacquer or enamel is contained and which discolors the lacquer or enamel. Where the lacquer or enamel is anhydrous corrosion of the cans in which it is contained is very greatly retarded. Further, anhydrous lacquer or enamel is advantageous over prior enamels in that the anhydrous product has less tendency to blush than a lacquer containing water, since moisture precipitated from the air in the drying of the lacquer or enamel does not dissolve in the lacquers and consequently precipitation of nitrocellulose in the film, which is the cause of blushing, is avoided. Further, the anhydrous lacquer produced in accordance with this invention is of advantage in that the rate of viscosity drop of nitrocellulose during storage is far less than is the rate of drop in lacquers in storage heretofore, since the rate of viscosity drop in nitrocellulose is accelerated by the presence of water.

The lacquers produced in accordance with this invention will also be found to possess a distinct advantage in that they have materially less tendency to orange peel when drying than in the case of prior lacquers.

As will be appreciated, in the carrying out of the method in accordance with this invention, no particular form of apparatus is required, it being necessary only to provide any suitable container for the original nitrocellulose solution or emulsion provided with suitable means of air blowing the solution or emulsion.

It will be further understood that in the claims appended hereto the term "a solvent" is intended to include solvent mixtures without or with diluents.

What I claim and desire to protect by Letters Patent is:

1. The method of producing a nitrocellulose solution which includes dissolving nitrocellulose carrying water in a volatile solvent therefor, which is substantially immiscible with water, whereby the water carried by the nitrocellulose is dispersed in the nitrocellulose solution in finely divided particles, and blowing the solution heated to a temperature within the range of about room temperature to about 100° C. with air at a temperature within the range of about room temperature to about 100° C., to effect evaporation of a mixture of water and volatile solvent from the solution.

2. The method of producing a nitrocellulose solution which includes dissolving nitrocellulose carrying water in a volatile solvent therefor, which is substantially immiscible with water, whereby the water carried by the nitrocellulose is dispersed in the nitrocellulose solution in finely divided particles, and blowing the solution heated to a temperature within the range of about room temperature to about 100° C. with air at approximately the same temperature, to effect evaporation of a mixture of water and volatile solvent from the solution.

3. The method of producing a nitrocellulose solution which includes dissolving nitrocellulose carrying water in hexyl acetate, whereby the water carried by the nitrocellulose is dispersed in the nitrocellulose solution in finely divided particles, and blowing the solution heated to a temperature within the range of about room temperature to about 100° C. with air at a temperature within the range of about room temperature to about 100° C., to effect evaporation of a mixture of water and volatile solvent from the solution.

4. The method of producing a nitrocellulose solution which includes dissolving nitrocellulose carrying water in a volatile solvent therefor which is substantially immiscible with water, whereby the water carried by the nitrocellulose is dispersed in the nitrocellulose in finely divided particles, and blowing the solution heated to a temperature of about 70° C. with air at a temperature of about 70° C. to effect evaporation of a mixture of water and volatile solvent from the solution.

CLEVELAND B. HOLLABAUGH.

---

CERTIFICATE OF CORRECTION.

Patent No. 2,114,491.   April 19, 1938.

CLEVELAND B. HOLLABAUGH.

It is hereby certified that error appears in the printed specification of the above numbered patent requiring correction as follows: Page 2, first column, line 56, under the heading "Per cent", for the numeral "2" read 25; and that the said Letters Patent should be read with this correction therein that the same may conform to the record of the case in the Patent Office.

Signed and sealed this 24th day of May, A. D. 1938.

(Seal)

Henry Van Arsdale,
Acting Commissioner of Patents.

or enamel is anhydrous corrosion of the cans in which it is contained is very greatly retarded. Further, anhydrous lacquer or enamel is advantageous over prior enamels in that the anhydrous product has less tendency to blush than a lacquer containing water, since moisture precipitated from the air in the drying of the lacquer or enamel does not dissolve in the lacquers and consequently precipitation of nitrocellulose in the film, which is the cause of blushing, is avoided. Further, the anhydrous lacquer produced in accordance with this invention is of advantage in that the rate of viscosity drop of nitrocellulose during storage is far less than is the rate of drop in lacquers in storage heretofore, since the rate of viscosity drop in nitrocellulose is accelerated by the presence of water.

The lacquers produced in accordance with this invention will also be found to possess a distinct advantage in that they have materially less tendency to orange peel when drying than in the case of prior lacquers.

As will be appreciated, in the carrying out of the method in accordance with this invention, no particular form of apparatus is required, it being necessary only to provide any suitable container for the original nitrocellulose solution or emulsion provided with suitable means of air blowing the solution or emulsion.

It will be further understood that in the claims appended hereto the term "a solvent" is intended to include solvent mixtures without or with diluents.

What I claim and desire to protect by Letters Patent is:

1. The method of producing a nitrocellulose solution which includes dissolving nitrocellulose carrying water in a volatile solvent therefor, which is substantially immiscible with water, whereby the water carried by the nitrocellulose is dispersed in the nitrocellulose solution in finely divided particles, and blowing the solution heated to a temperature within the range of about room temperature to about 100° C. with air at a temperature within the range of about room temperature to about 100° C., to effect evaporation of a mixture of water and volatile solvent from the solution.

2. The method of producing a nitrocellulose solution which includes dissolving nitrocellulose carrying water in a volatile solvent therefor, which is substantially immiscible with water, whereby the water carried by the nitrocellulose is dispersed in the nitrocellulose solution in finely divided particles, and blowing the solution heated to a temperature within the range of about room temperature to about 100° C. with air at approximately the same temperature, to effect evaporation of a mixture of water and volatile solvent from the solution.

3. The method of producing a nitrocellulose solution which includes dissolving nitrocellulose carrying water in hexyl acetate, whereby the water carried by the nitrocellulose is dispersed in the nitrocellulose solution in finely divided particles, and blowing the solution heated to a temperature within the range of about room temperature to about 100° C. with air at a temperature within the range of about room temperature to about 100° C., to effect evaporation of a mixture of water and volatile solvent from the solution.

4. The method of producing a nitrocellulose solution which includes dissolving nitrocellulose carrying water in a volatile solvent therefor which is substantially immiscible with water, whereby the water carried by the nitrocellulose is dispersed in the nitrocellulose in finely divided particles, and blowing the solution heated to a temperature of about 70° C. with air at a temperature of about 70° C. to effect evaporation of a mixture of water and volatile solvent from the solution.

CLEVELAND B. HOLLABAUGH.

---

CERTIFICATE OF CORRECTION.

Patent No. 2,114,491. April 19, 1938.

CLEVELAND B. HOLLABAUGH.

It is hereby certified that error appears in the printed specification of the above numbered patent requiring correction as follows: Page 2, first column, line 56, under the heading "Per cent", for the numeral "2" read 25; and that the said Letters Patent should be read with this correction therein that the same may conform to the record of the case in the Patent Office.

Signed and sealed this 24th day of May, A. D. 1938.

(Seal)

Henry Van Arsdale,
Acting Commissioner of Patents.

CERTIFICATE OF CORRECTION.

Patent No. 2,114,491. April 19, 1938.

CLEVELAND B. HOLLABAUGH.

It is hereby certified that error appears in the printed specification of the above numbered patent requiring correction as follows: Page 2, first column, line 56, under the heading "Per cent", for the numeral "2" read 25; and that the said Letters Patent should be read with this correction therein that the same may conform to the record of the case in the Patent Office.

Signed and sealed this 24th day of May, A. D. 1938.

(Seal)

Henry Van Arsdale,
Acting Commissioner of Patents.